United States Patent
Fedurco et al.

(10) Patent No.: US 12,404,406 B2
(45) Date of Patent: Sep. 2, 2025

(54) LAMINATE BASED ON SILICONE RUBBER COMPOSITIONS

(71) Applicant: COMPAGNIE GENERALE DES ETABLISSEMENTS MICHELIN, Clermont-Ferrand (FR)

(72) Inventors: Milan Fedurco, Clermont-Ferrand (FR); Marco Ribezzo, Clermont-Ferrand (FR); Antonio Delfino, Clermont-Ferrand (FR); Alain Faugeras, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 502 days.

(21) Appl. No.: 17/775,914

(22) PCT Filed: Nov. 26, 2020

(86) PCT No.: PCT/FR2020/052198
§ 371 (c)(1),
(2) Date: Aug. 26, 2022

(87) PCT Pub. No.: WO2021/105630
PCT Pub. Date: Jun. 3, 2021

(65) Prior Publication Data
US 2023/0045626 A1    Feb. 9, 2023

(30) Foreign Application Priority Data

Nov. 29, 2019 (FR) ..................... 1913474

(51) Int. Cl.
*C08L 83/04* (2006.01)
*B29D 30/06* (2006.01)
*C08G 77/12* (2006.01)
*C08G 77/20* (2006.01)
*C08K 3/36* (2006.01)
*C09D 183/04* (2006.01)

(52) U.S. Cl.
CPC .......... *C08L 83/04* (2013.01); *B29D 30/0654* (2013.01); *C08G 77/12* (2013.01); *C08G 77/20* (2013.01); *C08K 3/36* (2013.01); *C09D 183/04* (2013.01); *B29D 2030/0655* (2013.01); *B29K 2883/00* (2013.01); *C08L 2205/025* (2013.01); *C08L 2207/53* (2013.01)

(58) Field of Classification Search
CPC ............... C08L 83/04; C08L 2205/025; C08L 2207/53; B29D 30/0654; B29D 2030/0655; C08G 77/12; C08G 77/20; C08K 3/36; C09D 183/04; B29K 2883/00; B32B 25/042; B32B 25/20
See application file for complete search history.

(56) References Cited

U.S. PATENT DOCUMENTS

| | | | | | |
|---|---|---|---|---|---|
| 4,863,650 | A * | 9/1989 | Kohler | ............... | B29C 33/64 427/407.1 |
| 4,889,770 | A * | 12/1989 | Ona | ............... | B29C 33/64 528/901 |
| 5,538,793 | A * | 7/1996 | Inokuchi | ............... | C08J 3/124 428/407 |
| 5,582,885 | A * | 12/1996 | Nakamura | ............... | C08G 77/34 428/35.8 |
| 2004/0127636 | A1 * | 7/2004 | Yamamoto | ............... | C08L 83/04 524/588 |
| 2004/0266923 | A1 * | 12/2004 | Fehn | ............... | C09J 183/04 524/261 |
| 2006/0084753 | A1 * | 4/2006 | Dumont | ............... | C09D 183/04 524/588 |
| 2006/0093836 | A1 * | 5/2006 | Huang | ............... | C08F 287/00 428/447 |
| 2008/0093771 | A1 * | 4/2008 | Agostini | ............... | B29C 33/505 264/315 |
| 2017/0008210 | A1 * | 1/2017 | Koellnberger | ............... | C08J 7/042 |
| 2019/0016862 | A1 * | 1/2019 | Inokuchi | ............... | C09D 183/04 |
| 2022/0204770 | A1 * | 6/2022 | Vanecek | ............... | B32B 7/12 |

FOREIGN PATENT DOCUMENTS

| | | | |
|---|---|---|---|
| EP | 1384765 A1 | | 1/2004 |
| JP | H05192930 A | | 8/1993 |
| JP | H05192930 | * | 12/1993 |
| JP | H11198150 A | | 7/1999 |
| JP | 2017-219822 | * | 12/2017 |

OTHER PUBLICATIONS

Jp H05192930 Machine translation retrieved Dec. 23, 24.*
JP 2017-219822 Machine translation retrieved Dec. 23, 24.*
International Search Report and Written Opinion with English translation mailed Mar. 31, 2021 for International Application No. PCT/FR2020/052198, 13 pages.

* cited by examiner

*Primary Examiner* — Michael B Nelson
(74) *Attorney, Agent, or Firm* — Dickinson Wright PLLC

(57) ABSTRACT

A laminate comprising a first layer and a second layer directly covering the first layer, the first layer being a layer of a silicone rubber composition comprising a micrometric silicone powder and a mixture of crosslinkable organopolysiloxanes, the second layer being a layer of a silicone rubber composition comprising a hydrophobic silica and a mixture of crosslinkable organopolysiloxanes, is provided. The first layer and the second layer are crosslinked. The laminate, in particular when it is used as a coating for the outer surface of an expandable bladder for a tire curing mold, makes it possible to eliminate molding defects on the inner liner of the tire.

15 Claims, No Drawings

LAMINATE BASED ON SILICONE RUBBER COMPOSITIONS

CROSS-REFERENCE TO RELATED APPLICATIONS

This U.S. national phase patent application claims priority to and the benefit of International Patent Application No. PCT/FR2020/052198, filed on Nov. 26, 2020, which claims priority to and the benefit of French patent application no. FR1913474, filed Nov. 29, 2019, the contents of which are incorporated herein by reference in their entirety.

BACKGROUND

1. Technical Field

The field of the present invention is that of laminates based on silicone rubber compositions intended to be used as a coating on a crosslinked diene rubber surface, in particular of expandable curing bladders.

2. Related Art

Expandable curing bladders for the manufacture of tires are conventionally made of a rubbery material which is generally a crosslinked and reinforced composition of butyl rubber, a copolymer of isobutylene and isoprene. The constituent compositions of the curing bladders conventionally used therefore have a composition very similar to the rubber compositions which constitute the inner liner of the tires and which come into contact with the surface of the bladder of a curing mold when the tire is cured.

Specifically, tires are usually obtained by molding and vulcanizing a green casing inside a curing mold. The external walls of the casing are flattened against the internal walls of the curing mold by means of a curing bladder which can expand under the effect of a pressurized fluid. The tread pattern on the mold inserts and that on the shells are imprinted onto the green casing, which is vulcanized with the aid of heat.

The curing bladder opens out inside the green casing prior to curing and folds up at the end of each curing cycle. Due to the similarity in their chemical composition, the surface of the bladder and the surface of the inner liner of the tire tend to stick to one another. This propensity to stick can hamper the folding of the bladder at the end of a curing cycle, and also the operation for removing the tire from the mold, which results in both cases in a degradation of the surface of the curing bladder or of the inner surface of the inner liner of the tire. The surface of the curing bladder which comes into contact with the inner liner of the tire is referred to below as the outer surface of the bladder.

Furthermore, the cycles of opening and folding of the curing bladder inside the green casing give rise to sliding phenomena of the outer surface of the bladder over the inner liner of the tire. The repeated sliding cycles also have the consequence of producing deformations of the casing and wear of the bladder.

The curing of the tire releases gases such as steam into the curing mold, more particularly between the outer surface of the bladder and the surface of the inner liner of the tire. An accumulation of these gases which would be trapped between the outer surface of the bladder and the inner liner of the tire can cause local overheating or local overpressures on the outer surface of the bladder or on the inner liner, which generally results in molding defects, which defects are visible on the surface of the inner liner of the tire.

In order to limit molding defects resulting from the accumulation of gases, vents are provided in the curing press to facilitate the evacuation of the gases.

To prevent wear of the bladder and deformation of the casing, in particular by preventing their adhesion to one another, the inner liner of the green casing of the tires is generally coated with a solution with non-stick properties, for example based on silicone polymers, and known under the name of "lining cement". Such a treatment is carried out before the curing, by an operator who works on a dedicated station, at the end of the process for assembling the constituent semi-finished products of the tire. This operation proves to consume a great deal of time and manpower.

To overcome this problem, it has been proposed to eliminate this step by modifying the curing bladder, either by coating its outer surface with an aqueous dispersion of a non-reactive silicone oil and a silicone rubber powder, or by covering it with a crosslinked silicone rubber composition. Reference may for example be made to documents JP 2000-158454 and US20080093771. Since the surface of the bladder is covered with a crosslinked silicone rubber composition, the molding defects persist.

SUMMARY

The applicant has discovered that a laminate consisting of several layers of specific silicone rubber compositions makes it possible to solve the problems mentioned, when the laminate is used as a coating for the outer surface of an expandable bladder for a tire curing mold.

Thus, a first subject of the invention is a laminate comprising a first layer and a second layer directly covering the first layer, the first layer being a layer of a silicone rubber composition comprising a micrometric silicone powder and a mixture of crosslinkable organopolysiloxanes, the second layer being a layer of a silicone rubber composition comprising a hydrophobic silica and a mixture of crosslinkable organopolysiloxanes, the first layer and the second layer being crosslinked.

The invention also relates to an expandable bladder for a curing mold, which bladder is completely or partially formed of a laminate in accordance with the invention.

The invention also relates to a process for manufacturing a tire which comprises the curing of a green tire casing in a curing mold equipped with an expandable bladder in accordance with the invention.

DETAILED DESCRIPTION OF EXAMPLE EMBODIMENTS

The compounds mentioned in the description can be of fossil origin or be biobased. In the latter case, they may be partially or completely derived from biomass or be obtained from renewable starting materials derived from biomass. Elastomers, plasticizers, fillers and the like are concerned in particular.

In the present application, the term "liquid substance" is understood to mean a substance having the ability to eventually assume the shape of its container at room temperature (23° C.).

The term "directly covers" is understood to mean covers while being in contact with. For example, a layer which directly covers another layer corresponds to a layer which covers another layer while being in contact therewith.

The constituent silicone rubber composition of the first layer has the feature of comprising a micrometric silicone powder. A micrometric powder is understood to mean a powder consisting of microparticles. The micrometric silicone powder preferentially has an average size ranging from 5 to 100 µm, more preferentially ranging from 5 to 50 µm. The analysis of the size of the microparticles can be carried out in order to determine in particular the average size of the microparticles (or median diameter for microparticles assumed to be substantially spherical), in particular according to the ISO-8130-13 standard. The micrometric silicone powder preferentially has a Shore A hardness of less than 60, more preferentially less than 50, even more preferentially between 20 and 40. As is well known, the Shore A hardness is typically determined by the ASTM D 2240-97 standard.

Micrometric silicone powders are well-known products and are described for example in patent application U.S. Pat. No. 5,538,793. These are also products that are commercially available, for example under the trade names KMP-594, KMP-597, KMP-598, KMP-600, KMP-601 and KMP-602 from Shin-Etsu Co. Preferably, the micrometric silicone powder consists of crosslinked silicone rubber microparticles coated with a silicone resin, the silicone resin being a polyorganosilsesquioxane. The microparticles with the trade names KMP-600, KMP-601 and KMP-602 from Shin-Etsu Co., more particularly still the microparticles with the trade name KMP-602, are very particularly suitable.

Preferably, the micrometric silicone powder is present in the silicone rubber composition of the first layer at a weight content of from 5% to 35% of the total weight of the silicone rubber composition of the first layer.

The constituent silicone rubber composition of the second layer has the feature of comprising a hydrophobic silica. As is known, a hydrophobic silica is a silica, part of the surface of which is covered with organic groups such as alkyl groups. The silica can be any reinforcing silica known to those skilled in the art, in particular any precipitated or fumed silica. Preferably, the hydrophobic silica has a BET specific surface area of less than 450 m²/g, preferentially within a range of from 80 to 400 m²/g, in particular from 100 to 300 m²/g, advantageously from 150 to 250 m²/g. It is also possible to use a mixture of several hydrophobic silicas.

To make the silica hydrophobic, it is well known to modify the surface of the silica. The modification of the surface of a silica can be obtained in a known manner by reacting the silica with compounds which bear hydrophobic groups such as trialkylsilyl groups, in particular trimethylsilyl groups. A silica which has a surface modified by trimethylsilyl groups, more particularly a silica modified by hexamethyldisilazane, is very particularly suitable. According to any one of the embodiments of the invention, the hydrophobic silica contains preferentially more than 2% by weight of carbon, more preferably at least 3% by weight of carbon.

In the present disclosure, the BET specific surface area is determined by gas adsorption using the Brunauer-Emmett-Teller method described in "The Journal of the American Chemical Society", (vol. 60, page 309, February 1938), and more specifically according to a method derived from standard NF ISO 5794-1, appendix E, of June 2010 [multipoint (5 point) volumetric method—gas: nitrogen—degassing under vacuum: one hour at 160° C.—relative pressure p/po range: 0.05 to 0.17].

The content of hydrophobic silica is adjusted by those skilled in the art depending on its specific surface area and on the use of the silicone rubber composition. Preferably, the hydrophobic silica is present in the silicone rubber composition of the second layer at a weight content of greater than or equal to 5% of the total weight of the silicone rubber composition of the second layer and less than or equal to 40% of the total weight of the silicone rubber composition of the second layer.

The constituent silicone rubber compositions of the first layer and of the second layer also have another feature of comprising a mixture of crosslinkable organopolysiloxanes. According to any one of the embodiments of the invention, the mixture of crosslinkable organopolysiloxanes preferentially represents more than 50% by weight of the silicone rubber composition which contains it. In other words, the mixture of crosslinkable organopolysiloxanes in the first layer preferentially represents more than 50% by weight of the silicone rubber composition of the first layer, and the mixture of crosslinkable organopolysiloxanes in the second layer preferentially represents more than 50% by weight of the silicone rubber composition of the second layer.

Preferably, the mixture of crosslinkable organopolysiloxanes is a mixture of a first liquid organopolysiloxane and a second liquid organopolysiloxane. The first organopolysiloxane has $(R_2SiO_{2/2})$ repeating units and has two chain ends each bearing an alkenyl group, the second organopolysiloxane has $(R'HSiO_{2/2})$ repeating units and has two chain ends each bearing an $SiR'_3O_{1/2}$ group, the R symbols, which may be identical or different, representing an alkyl, aryl or aralkyl group, the R' symbols, which may be identical or different, representing an alkyl group.

Preferably, at least one of the first organopolysiloxane and second organopolysiloxane has a linear chain. Preferentially, the first organopolysiloxane and the second organopolysiloxane have a linear chain.

The alkenyl group at the chain end of the first organopolysiloxane is preferentially a vinyl group. The groups represented by the symbols R and R' preferentially contain 1 to 8 carbon atoms, more preferentially 1 to 3 carbon atoms. The R symbols in the $(R_2SiO_{2/2})$ units preferentially represent an alkyl. The first organopolysiloxane is preferentially a polydialkylsiloxane, more preferentially a polydimethylsiloxane. The second organopolysiloxane is preferentially a polyhydromethylsiloxane. The R' symbols in $SiR'_3O_{1/2}$ preferentially represent a methyl. Advantageously, the second organopolysiloxane is a linear polyhydromethylsiloxane bearing at its chain ends an $SiMe_3O_{1/2}$ group.

The first organopolysiloxane preferentially has a weight-average molecular mass of greater than 5000 and less than 200 000 g/mol, more preferentially greater than 10 000 and less than 150 000 g/mol. The second organopolysiloxane preferentially has a weight-average molecular mass of greater than 500 and less than 30 000 g/mol, more preferentially greater than 500 and less than 10 000 g/mol, more preferentially still greater than 1000 and less than 5000 g/mol.

According to a specific embodiment of the invention, the ratio of the number of $(R'HSiO_{2/2})$ units to the number of alkenyl groups is greater than 5, preferentially greater than 15, more preferentially greater than 25. The ratio of the number of $(R'HSiO_{2/2})$ units to the number of alkenyl groups is advantageously less than 100, more advantageously less than 90. In particular, the ratio of the number of $(RHSiO_{2/2})$ units to the number of alkenyl groups is greater than 25 and less than 90. On the basis of these preferred ratios, the respective amounts of the first organopolysiloxane and of the second organopolysiloxane in the composition according to the invention are adjusted accordingly. The rubber composition according to this specific embodiment, including in its preferred variants, can be used as a coating on the surface of a curing bladder without it being necessary beforehand to apply an adhesion primer to the surface of the bladder or to carry out a plasma or corona treatment.

The constituent silicone rubber compositions of the first layer and of the second layer typically contain a catalyst capable of catalysing the crosslinking of the mixture of crosslinkable organopolysiloxanes. When the crosslinking proceeds from a hydrosilylation reaction, for example by reaction of (R'HSiO$_{2/2}$) units as defined above on alkenyl groups, the catalyst is a hydrosilylation catalyst, typically containing platinum Pt(0) complexed with divinyltetraalkylsiloxane ligands, preferably 1,3-divinyltetramethylsiloxane. Such catalysts are for example described in document WO 0142258 A1. Karstedt's catalyst is very particularly suitable. As in any conventional hydrosilylation reaction, the amount of catalyst in the composition is catalytic. A catalytic amount is understood to mean less than one molar equivalent of platinum relative to the amount of olefinic double bond type unsaturations present in the composition. In general, it is sufficient to introduce less than 1000 ppm and preferably more than 30 ppm of platinum calculated relative to the total mass of the first organopolysiloxane and of the second organopolysiloxane present in each of the layers. Thus, according to certain specific embodiments, the constituent silicone rubber compositions of the first layer and of the second layer contain a hydrosilylation catalyst capable of catalysing the crosslinking of the mixture of crosslinkable organopolysiloxanes.

Crosslinking is typically initiated by bringing the silicone rubber composition to a temperature sufficient to enable the crosslinking. It is generally carried out at a temperature between 15° C. and 300° C., for example between 20° C. and 240° C., better still between 70° C. and 200° C.

When crosslinking proceeds from a hydrosilylation reaction, in a known manner, the crosslinkable silicone compositions generally contain an inhibitor. Inhibitors are generally used to regulate the temperature and time of the hydrosilylation crosslinking reaction and thus further control the crosslinking reaction, in particular the initiation thereof and the rate thereof. If a crosslinking inhibitor is used, the amount of inhibitor used is preferentially from 1 to 50 000 ppm, more preferentially from 20 to 2000 ppm, and in particular from 100 to 1000 ppm, relative to the total mass of the first organopolysiloxane and of the second organopolysiloxane. Very particularly suitable as inhibitor are acetylenic alcohols, such as 1-ethynyl-1-cyclohexanol, 2-methyl-3-butyn-2-ol, 3,5-dimethyl-1-hexyn-3-ol, 3-methyl-1-dodecyn-3-ol, 2-phenyl-3-butyn-2-ol. Preferably, the silicone rubber composition according to the invention contains an inhibitor.

According to yet another specific embodiment of the invention, the constituent silicone rubber composition of one of the first and second layers, preferably of the second layer, further contains polyamide microparticles which have a melting point above 100° C. The incorporation of the polyamide microparticles makes it possible to improve the friction resistance properties of the laminate when the laminate is used as a coating for the outer surface of a curing bladder. This result is obtained without the coating losing its flexibility to be able to deform according to the curing cycles while retaining its adhesion to the surface of the curing bladder despite the repeated deformations of the bladder which opens and folds on itself in each curing cycle.

Preferably, the constituent silicone rubber composition of the second layer contains polyamide microparticles having a melting point above 100° C.

The polyamide microparticles may be products that are available commercially, for example from the company Arkema, such as those sold under the name "Orgasol". The polyamide microparticles may be of any shape, preferentially they are spherical.

The polyamide microparticles preferably have a melting point above 150° C. The melting point is conventionally measured according to the ASTM D3418-03 standard. As suitable polyamides, mention may be made of nylon 6, nylon 6,6, nylon 6,10, nylon 6,12, nylon 11 and nylon 12. The polyamide microparticles preferably have a particle size of from 5 to 100 μm, advantageously from 10 to 70 μm. The particle size is typically determined according to the ISO 13319-2007 standard.

The silicone rubber composition which contains the polyamide microparticles preferentially contains from 5% to 15% of its weight thereof. In other words, the weight content of the polyamide microparticles in a silicone rubber composition which contains the polyamide microparticles is greater than or equal to 5% and less than or equal to 15% of the total weight of the silicone rubber composition. When the constituent silicone rubber composition of the second layer contains polyamide microparticles, the total content of hydrophobic silica and polyamide microparticles in the second layer preferentially varies from 10% to 45% of the total weight of the constituent silicone rubber composition of the second layer.

The constituent silicone rubber composition of the first layer can be prepared by incorporating the micrometric silicone powder into the first organopolysiloxane, followed by the addition of the second polyorganosiloxane with mixing, and finally the addition of the catalyst. When an inhibitor is used, it is typically added to the mixture of micrometric silicone powder and the first organopolysiloxane before the incorporation of the second organopolysiloxane. To facilitate mixing, a silicone solvent, preferably decamethylcyclopentasiloxane, is preferably added. The addition of the solvent makes it possible not only to facilitate the incorporation of the constituents of the silicone rubber composition and the homogenization thereof in the silicone rubber composition, but also to adjust the viscosity of the silicone rubber composition with a view to applying it on a substrate. When the silicone rubber composition is crosslinked, all or part of the solvent is removed during the crosslinking of the silicone rubber composition.

The constituent silicone rubber composition of the second layer is prepared in an analogous manner except that the micrometric silicone powder is replaced by hydrophobic silica.

To prepare the laminate in accordance with the invention, a first layer consisting of the silicone rubber composition still in the uncured state and comprising the hydrophobic silica and the mixture of crosslinkable organopolysiloxanes is formed and then crosslinked, and then a second layer consisting of the silicone rubber composition still in the uncured state and comprising the micrometric silicone powder and the mixture of crosslinkable organopolysiloxanes is deposited and then crosslinked. The first layer preferentially has a thickness ranging from 5 to 100 μm, the second layer preferentially has a thickness ranging from 5 to 100 μm. The deposition of the silicone rubber compositions may be carried out using a fine brush, a brush or by spraying.

When the laminate is brought into contact with an inner liner of a tire by pressing the surface of the first layer of the laminate on the surface of the inner liner of a tire, the laminate can be detached from the inner liner without degradation of either the laminate or the inner liner. Furthermore, any relative movement between the laminate and the inner rubber is facilitated by the sliding properties of the first layer on the surface of the inner liner.

According to a very particularly preferred embodiment of the invention, the laminate contains a third layer of a crosslinked diene rubber composition, the second layer directly covering the third layer.

According to a preferred variant of this very particularly preferred embodiment of the invention, the constituent rubber composition of the third layer comprises a butyl rubber which advantageously represents more than 90%, better still 100% by weight of all the elastomers of the constituent rubber composition of the third layer.

According to this preferred variant, the laminate then composed of 3 layers advantageously constitutes all or part of an expandable bladder for a curing mold, the first layer having a thickness preferentially ranging from 5 to 100 µm, the second layer having a thickness preferentially ranging from 5 to 100 µm. The thickness of the third layer is chosen by those skilled in the art according to the use made of the laminate. The third layer typically has a thickness ranging from 1 to 10 mm, in particular when the laminate is intended to constitute all or part of an expandable bladder for a tire curing mold.

Expandable curing bladders, in particular intended for the manufacture of tires, are well known to those skilled in the art. They consist of compositions based on halogenated or non-halogenated butyl rubber. Butyl rubber is a copolymer of isobutylene and isoprene known for its airtightness properties. A rubber composition constituting an expandable curing bladder generally contains a reinforcing filler such as a carbon black. It also contains a crosslinking system composed of a resin. Crosslinking systems composed of a resin and used to crosslink rubber compositions for an expandable curing bladder are also well known to those skilled in the art. The resin is typically a halogenated or non-halogenated phenolic resin. As phenolic resin, mention may be made of phenol-formaldehyde resins. The rubber composition constituting a curing bladder may comprise various ingredients such as antioxidants, antiozonants, pigments, waxes, plasticizers such as processing oils.

When the laminate constitutes an expandable bladder for a tire curing mold, the first layer of the laminate is intended to come into contact with the inner liner of the tire in the curing mold. Not only does the laminate prevent the bladder from sticking to the inner liner of the tire, but it also promotes the sliding thereof on the surface of the inner liner while facilitating the evacuation of the curing gases. Consequently, the expandable bladder for a curing mold which consists of a laminate in accordance with the invention and which is another subject of the invention, can be used for several curing cycles in a tire curing mold without molding defects being observed, which makes it possible to reduce the frequency of changing the bladders in the curing mold and thus to increase the productivity of a tire manufacturing process. The bladder according to the invention is typically a bladder intended to be used in a tire curing mold.

In summary, the invention can be implemented according to any one of embodiments 1 to 48:

Embodiment 1: Laminate comprising a first layer and a second layer directly covering the first layer, the first layer being a layer of a silicone rubber composition comprising a micrometric silicone powder and a mixture of crosslinkable organopolysiloxanes, the second layer being a layer of a silicone rubber composition comprising a hydrophobic silica and a mixture of crosslinkable organopolysiloxanes, the first layer and the second layer being crosslinked.

Embodiment 2: Laminate according to embodiment 1, in which the micrometric silicone powder consists of crosslinked silicone rubber microparticles that are coated with a silicone resin, the silicone resin being a polyorganosilsesquioxane.

Embodiment 3: Laminate according to embodiment 1 or 2, in which the micrometric silicone powder has a Shore A hardness of less than 60, preferentially less than 50, more preferentially between 20 and 40.

Embodiment 4: Laminate according to any one of embodiments 1 to 3, in which the micrometric silicone powder has an average size of from 5 to 100 µm.

Embodiment 5: Laminate according to any one of embodiment 1 to 4, in which the micrometric silicone powder has an average size of from 5 to 50 µm.

Embodiment 6: Laminate according to any one of embodiments 1 to 5, in which the micrometric silicone powder is present in the rubber composition of the first layer at a weight content of from 5% to 35% of the total weight of the silicone rubber composition of the first layer.

Embodiment 7: Laminate according to any one of embodiments 1 to 6, in which the hydrophobic silica has a BET specific surface area of from 100 to 300 $m^2/g$, preferably from 150 to 250 $m^2/g$.

Embodiment 8: Laminate according to any one of embodiments 1 to 7, in which the hydrophobic silica is a silica having a surface modified by trimethylsilyl groups.

Embodiment 9: Laminate according to any one of embodiments 1 to 8, in which the hydrophobic silica is a silica having a surface modified by hexamethyldisilazane.

Embodiment 10: Laminate according to any one of embodiments 1 to 9, in which the hydrophobic silica contains more than 2% by weight of carbon, preferentially at least 3% by weight of carbon.

Embodiment 11: Laminate according to any one of embodiments 1 to 10, in which the hydrophobic silica is present in the silicone rubber composition of the second layer at a weight content of greater than or equal to 5% of the total weight of the silicone rubber composition of the second layer and less than or equal to 40% of the total weight of the silicone rubber composition of the second layer.

Embodiment 12: Laminate according to any one of embodiments 1 to 11, in which the mixture of crosslinkable organopolysiloxanes of the first layer and of the second layer is a mixture of a first liquid organopolysiloxane and a second liquid organopolysiloxane, the first organopolysiloxane having ($R_2SiO_{2/2}$) repeating units and having two chain ends each bearing an alkenyl group, the second organopolysiloxane having ($R'HSiO_{2/2}$) repeating units and having two chain ends each bearing an $SiR'_3O_{1/2}$ group, the R symbols, which may be identical or different, representing an alkyl, aryl or aralkyl group, the R' symbols, which may be identical or different, representing an alkyl group.

Embodiment 13: Laminate according to embodiment 12, in which the alkenyl group is a vinyl group.

Embodiment 14: Laminate according to embodiment 12 or 13, in which the groups represented by the symbols R and R' contain from 1 to 8 carbon atoms, preferably from 1 to 3 carbon atoms.

Embodiment 15: Laminate according to any one of embodiments 12 to 14, in which the R symbols in the ($R_2SiO_{2/2}$) units represent an alkyl.

Embodiment 16: Laminate according to any one of embodiments 12 to 15, in which at least one of the first organopolysiloxane and second organopolysiloxane has a linear chain.

Embodiment 17: Laminate according to any one of embodiments 12 to 16, in which the first organopolysiloxane and the second organopolysiloxane have a linear chain.

Embodiment 18: Laminate according to any one of embodiments 12 to 17, in which the first organopolysiloxane is a polydialkylsiloxane.

Embodiment 19: Laminate according to any one of embodiments 12 to 18, in which the first organopolysiloxane is a polydimethylsiloxane.

Embodiment 20: Laminate according to any one of embodiments 12 to 19, in which the second organopolysiloxane is a polyhydromethylsiloxane.

Embodiment 21: Laminate according to any one of embodiments 12 to 20, in which the R' symbols in $SiR'_3O_{1/2}$ represent a methyl.

Embodiment 22: Laminate according to any one of embodiments 12 to 21, in which the first organopolysiloxane has a weight-average molecular mass of greater than 5000 and less than 200 000 g/mol, preferably greater than 10 000 and less than 150 000 g/mol.

Embodiment 23: Laminate according to any one of embodiments 12 to 22, in which the second organopolysiloxane has a weight-average molecular mass of greater than 500 and less than 30 000 g/mol, preferably greater than 500 and less than 10 000 g/mol, more preferentially greater than 1000 and less than 5000 g/mol.

Embodiment 24: Laminate according to any one of embodiments 12 to 23, in which the ratio of the number of ($R'HSiO_{2/2}$) units to the number of alkenyl groups is greater than 5.

Embodiment 25: Laminate according to any one of embodiments 12 to 24, in which the ratio of the number of ($R'HSiO_{2/2}$) units to the number of alkenyl groups is greater than 15.

Embodiment 26: Laminate according to any one of embodiments 12 to 25, in which the ratio of the number of ($R'HSiO_{2/2}$) units to the number of alkenyl groups is greater than 25.

Embodiment 27: Laminate according to any one of embodiments 12 to 26, in which the ratio of the number of ($R'HSiO_{2/2}$) units to the number of alkenyl groups is less than 100.

Embodiment 28: Laminate according to any one of embodiments 12 to 27, in which the ratio of the number of ($R'HSiO_{2/2}$) units to the number of alkenyl groups is less than 90.

Embodiment 29: Laminate according to any one of embodiments 12 to 28, in which the ratio of the number of ($RHSiO_{2/2}$) units to the number of alkenyl groups is greater than 25 and less than 90.

Embodiment 30: Laminate according to any one of embodiments 1 to 29, in which the constituent silicone rubber compositions of the first layer and of the second layer contain a catalyst capable of catalysing the crosslinking of the mixture of crosslinkable organopolysiloxanes.

Embodiment 31: Laminate according to any one of embodiments 1 to 30, in which the constituent silicone rubber compositions of the first layer and of the second layer contain a hydrosilylation catalyst capable of catalysing the crosslinking of the mixture of crosslinkable organopolysiloxanes.

Embodiment 32: Laminate according to embodiment 31, in which the hydrosilylation catalyst is a hydrosilylation catalyst containing Pt(0) complexed with divinyltetraalkylsiloxane ligands.

Embodiment 33: Laminate according to either one of embodiments 31 and 32, in which the hydrosilylation catalyst is Karstedt's catalyst.

Embodiment 34: Laminate according to any one of embodiments 1 to 33, in which the constituent silicone rubber compositions of the first layer and of the second layer contain an inhibitor.

Embodiment 35: Laminate according to any one of embodiments 1 to 34, in which the constituent silicone rubber composition of one of the first and second layers contains polyamide microparticles having a melting point above 100° C.

Embodiment 36: Laminate according to any one of embodiments 1 to 35, in which the constituent silicone rubber composition of the second layer contains polyamide microparticles having a melting point above 100° C.

Embodiment 37: Laminate according to embodiment 36, in which the total content of hydrophobic silica and polyamide microparticles in the second layer preferentially varies from 10% to 45% of the total weight of the constituent silicone rubber composition of the second layer.

Embodiment 38: Laminate according to any one of embodiments 35 to 37, in which the polyamide microparticles have a melting point above 150° C.

Embodiment 39: Laminate according to any one of embodiments 35 to 38, in which the polyamide microparticles have a particle size of from 5 to 100 µm.

Embodiment 40: Laminate according to any one of embodiments 35 to 39, in which the polyamide microparticles have a particle size of from 10 to 70 µm.

Embodiment 41: Laminate according to any one of embodiments 35 to 40, in which the silicone rubber composition which contains the polyamide microparticles contains from 5% to 15% of its weight thereof.

Embodiment 42: Laminate according to any one of embodiments 1 to 41, in which the mixture of crosslinkable organopolysiloxanes represents more than 50% by weight of the silicone rubber composition which contains it.

Embodiment 43: Laminate according to any one of embodiments 1 to 42, in which the first layer has a thickness ranging from 5 to 100 µm and the second layer a thickness ranging from 5 to 100 µm.

Embodiment 44: Laminate according to any one of embodiments 1 to 43, which laminate contains a third layer of a crosslinked diene rubber composition, the second layer directly covering the third layer.

Embodiment 45: Laminate according to embodiment 44, in which the constituent crosslinked diene rubber composition of the third layer comprises a butyl rubber.

Embodiment 46: Laminate according to embodiment 45, in which the butyl rubber represents more than 90%, better still 100% by weight of all the elastomers of the constituent rubber composition of the third layer.

Embodiment 47: Expandable bladder for a curing mold, which bladder is completely or partially formed of a laminate defined in any one of embodiments 44 to 46.

Embodiment 48: Process for manufacturing a tire which comprises the curing of a green tire casing in a curing mold equipped with an expandable bladder defined according to embodiment 47.

EXAMPLES

Elongation Test:

The sample to be tested is obtained using a 10 [mm]×140 [mm] hollow punch. The sample is placed in a vice. Using a gripper and a 300 [mm] ruler, the sample is stretched until 100% deformation is achieved. This deformation is performed 10 times at a frequency of 1 Hz.

Friction Test:

It is carried out on a steel bar with a roughness of around 1.6. Diameter 12 [mm] and length 70 [mm]. The bar is placed vertically in the vice. The sample already tested in elongation is used. The sample is moved back and forth with a curvature of 180° on the treated side (face of the sample coated with the silicone rubber composition) against the bar while exerting a friction force of 5 kilogram-force. 20 cycles are repeated, one cycle corresponding to a back and forth movement at a frequency of between 1 and 2 Hz.

Analysis:

After the elongation test or friction test, the sample is observed by scanning microscopy analysis (FEG 250 model from the company FEI/ThermoFischer, ETD detector (Everhart Thornley detector), 1 kV) to verify the presence or absence of cracks or delamination. The microscopy analysis also makes it possible to estimate the thickness of the layer of the silicone rubber composition applied as a coating.

Preparation of the Rubber Compositions

Example 1

A hydrophobic silica (5.846 g, HDK-2000, Wacker) is incorporated into an α,ω-vinyl polydimethylsiloxane (10.815 g, DMS V35, with a weight-average molecular mass of 49 500, Gelest) by mixing for one minute in a mixer (StateMix). A solution of inhibitor (11 mg, 1-ethynyl-1-cyclohexanol, Aldrich E51406) in decamethylcyclopentasiloxane (10.366 g, TCI Europe, D1890) is then added by mixing for one minute in the mixer (StateMix). The polyamide microparticles (1.95 g, Orgasol ES3 Nat 3, Arkema) are added and everything is mixed in the mixer for 1 minute (StateMix). A solution of PHMS (0.86 g, poly(methylhydro)siloxane, Mw 3200, reference 17.620-6, Sigma Aldrich) in decamethylcyclopentasiloxane (4.21 g, D, TCI Europe, D1890) is incorporated into the resulting mixture by mixing in the mixer (StateMix, operating at 100% of its power). To finish, a solution of Karstedt's catalyst (36.1 µl, Aldrich 479519) in decamethylcyclopentasiloxane (15.89 g, TCI Europe, D1890) is added. The resulting mixture is homogenized in the mixer (StateMix) for 1 minute.

The silicone rubber composition thus obtained is applied using a fine brush in the form of a layer on a curing bladder based on butyl rubber. The resulting laminate is brought to 150° C. for 30 minutes in a ventilated air oven. In the silicone rubber composition, the ratio of the number of (MeHSiO$_{2/2}$) units to the number of vinyl groups is 32.

The crosslinked silicone rubber composition in the form of a layer with a thickness of 20-50 µm exhibits good adhesion to the bladder and does not detach from the bladder even after having successively undergone 10 elongations at 100% deformation.

Furthermore, it is observed that the polyamide microparticles are not removed from the coating by friction. The polyamide microparticles are not torn from the coating when subjected to the friction test.

Deposited on this 20-50 µm thick layer of crosslinked silicone rubber composition is a layer of a second silicone rubber composition obtained as follows:

28.75 g of micrometric silicone powder (KMP-602, Shin-Etsu, Japan) are incorporated into an α,ω-vinyl polydimethylsiloxane (62.1 g, DMS V35, with a weight-average molecular mass of 49 500, Gelest) by mixing for one minute in a mixer (StateMix). A solution of inhibitor (63 mg, 1-ethynyl-1-cyclohexanol, Aldrich E51406) in decamethylcyclopentasiloxane (9.09 g, TCI Europe, D1890) is then added by mixing for one minute in the mixer (StateMix). Decamethylcyclopentasiloxane (16.8 g, TCI Europe, D1890) is incorporated into the resulting mixture (34.32 mg) by mixing for one minute in a mixer (StateMix). A solution of PHMS (1.823 g, poly(methylhydro)siloxane, Mw 3200, reference 17,620-6, Sigma Aldrich) in decamethylcyclopentasiloxane (5.1 g, TCI Europe, D1890) is added to the resulting mixture by mixing in the mixer (StateMix, operating at 100% of its power). To finish, a solution of Karstedt's catalyst (75 µl, Aldrich 479519) in decamethylcyclopentasiloxane (41.9 g, TCI Europe, D1890) is added. The resulting mixture is homogenized in the mixer ("StateMix") for 1 minute.

The silicone rubber composition thus obtained is applied using a fine brush in the form of a layer on the 20-50 µm thick crosslinked silicone rubber composition described in the first part of Example 1. The resulting laminate is brought to 150° C. for 30 minutes in a ventilated air oven.

Example 2 not in Accordance with the Invention

Example 2 differs from Example 1 in that the laminate does not contain a layer of silicone rubber composition comprising a micrometric silicone powder.

The curing bladders are used in a tire curing mold to cure a green tire casing.

In the case of Example 2, on removal from the mold and from the end of the first curing cycle, molding defects are observed on the inner liner of the cured tire, such as irregularities, holes, folds.

These molding defects are not observed for the bladder of Example 1 in accordance with the invention. Furthermore, the 20-50 µm thick crosslinked silicone rubber composition exhibits good adhesion to the bladder even after having successively undergone 10 elongations at 100% deformation. It is also observed that the silicone microparticles are not removed from the coating by friction. The silicone microparticles are not torn from the coating when subjected to the friction test. It is also observed that the polyamide microparticles are not removed from the coating by friction. The polyamide and silicone microparticles are not torn from the coating when subjected to the friction test.

The bladder of Example 1 can be used for several curing cycles without degradation of its outer surface and without molding defects being observed.

The invention claimed is:

1. A laminate comprising a first layer, a second layer, and a third layer of a crosslinked diene rubber composition, the second layer directly covering the first layer and the third layer directly covering the second layer, the first layer being a layer formed from a first silicone rubber composition comprising a micrometric silicone powder and a first mixture of crosslinkable organopolysiloxanes, the second layer being a layer formed from a second silicone rubber composition comprising a hydrophobic silica, polyamide microparticles having a melting point above 100° C., and a second mixture of crosslinkable organopolysiloxanes, the first layer and the second layer being crosslinked, and the first layer not including the polyamide microparticles.

2. The laminate according to claim 1, in which the micrometric silicone powder consists of crosslinked silicone rubber microparticles that are coated with a silicone resin, the silicone resin being a polyorganosilsesquioxane.

3. The laminate according to claim 1, in which the micrometric silicone powder is present in the first silicone rubber composition at a weight content of from 5% to 35% of the total weight of the first silicone rubber composition.

4. The laminate according to claim 1, in which the hydrophobic silica is present in the second silicone rubber composition at a weight content of greater than or equal to 5% of the total weight of the second silicone rubber composition and less than or equal to 40% of the total weight of the second silicone rubber composition.

5. The laminate according to claim 1, in which the first and second mixtures of crosslinkable organopolysiloxanes are each a mixture of a first liquid organopolysiloxane and a second liquid organopolysiloxane, the first liquid organopolysiloxane having $R_2SiO_{2/2}$ repeating units and having two chain ends each bearing an alkenyl group, the second liquid organopolysiloxane having $R'HSiO_{2/2}$ repeating units and having two chain ends each bearing an $SiR'_3O_{1/2}$ group, the R symbols, which may be identical or different, representing an alkyl, aryl or aralkyl group, the R' symbols, which may be identical or different, representing an alkyl group.

6. The laminate according to claim 5, in which the first liquid organopolysiloxane is a polydialkylsiloxane, and the second liquid organopolysiloxane is a polyhydromethylsiloxane.

7. The laminate according to claim 1, in which the second silicone rubber composition contains from 5% to 15% of the polyamide microparticles.

8. The laminate according to claim 1, in which the first mixture of crosslinkable organopolysiloxanes represents more than 50% by weight of the first silicone rubber composition and the second mixture of crosslinkable organopolysiloxanes represents more than 50% by weight of the second silicone rubber composition.

9. The laminate according to claim 1, in which the first layer has a thickness ranging from 5 to 100 µm and the second layer a thickness ranging from 5 to 100 µm.

10. The laminate according to claim 1, in which the crosslinked diene rubber composition of the third layer comprises a butyl rubber.

11. The laminate according to claim 5, in which the two chain ends of the first liquid organopolysiloxane bear a vinyl group.

12. The laminate according to claim 6, in which the first liquid organopolysiloxane is polydimethylsiloxane.

13. The laminate according to claim 1, in which the polyamide microparticles of the second layer have a melting point above 150° C.

14. An expandable bladder for a curing mold, which bladder is completely or partially formed of the laminate according to claim 1.

15. A process for manufacturing a tire which comprises the curing of a green tire casing in a curing mold equipped with the expandable bladder according to claim 14.

* * * * *